(12) United States Patent
Khalid

(10) Patent No.: US 11,330,448 B2
(45) Date of Patent: May 10, 2022

(54) DYNAMIC ADAPTATION OF MOBILE NETWORK COVERAGE

(71) Applicant: CHARTER COMMUNICATIONS OPERATING, LLC, St. Louis, MO (US)

(72) Inventor: Saran Khalid, Denver, CO (US)

(73) Assignee: CHARTER COMMUNICATIONS OPERATING, INC., St. Louis, MO (US)

( * ) Notice: Subject to any disclaimer, the term of this patent is extended or adjusted under 35 U.S.C. 154(b) by 0 days.

(21) Appl. No.: 16/897,878

(22) Filed: Jun. 10, 2020

(65) Prior Publication Data

US 2021/0392517 A1    Dec. 16, 2021

(51) Int. Cl.
*H04W 24/02* (2009.01)
*H04W 28/24* (2009.01)
*H04W 64/00* (2009.01)
*H04W 8/24* (2009.01)

(52) U.S. Cl.
CPC ............. *H04W 24/02* (2013.01); *H04W 8/24* (2013.01); *H04W 28/24* (2013.01); *H04W 64/00* (2013.01)

(58) Field of Classification Search
CPC ... H04W 72/042; H04W 24/10; H04W 24/08; H04W 72/082; H04W 72/085; H04W 52/241; H04W 24/02; H04W 28/04; H04W 52/243; H04W 72/044; H04W 72/0453; H04W 72/048; H04W 72/1231; H04W 28/0236; H04W 72/046; H04W 4/02; H04W 64/00; H04W 24/06; H04W 36/20; H04W 40/12; H04W 72/04; H04W 72/0406; H04W 72/0433; H04W 72/12; H04W 16/10; H04W 4/027; H04W 52/146; H04W 64/003; H04W 72/10; H04W 16/28; H04W 24/04; H04W 28/0268; H04W 28/06; H04W 36/22; H04W 36/30; H04W 40/16; H04W 52/14; H04W 72/0486; H04W 72/1226; H04W 74/002; H04W 76/18; H04W 16/18; H04W 28/0226; H04W 28/0231; H04W 28/20; H04W 36/0061; H04W 36/165; H04W 36/32;
(Continued)

(56) References Cited

U.S. PATENT DOCUMENTS 9,571,336 B2    2/2017   Hamalainen et al.
2009/0023477 A1  1/2009   Staudte
(Continued)

FOREIGN PATENT DOCUMENTS

EP    2705715 B1    9/2017

*Primary Examiner* — Kwasi Karikari
(74) *Attorney, Agent, or Firm* — Meagher Emanuel Laks Goldberg & Liao, LLP

(57) ABSTRACT

Various embodiments comprise systems, methods, architectures, mechanisms and apparatus for dynamically adapting category-specific radio coverage area of a mobile network using information received from corresponding common-category user equipment (UE) active within the mobile network indicative of UE capability, UE location, and UE quality of service (QoS) such that category-specific service edge locations and corresponding category-specific coverage gaps therebetween may be determined and automatically mitigated by optimizing or augmenting deployed network equipment.

20 Claims, 7 Drawing Sheets

(58) Field of Classification Search
CPC ....... H04W 40/20; H04W 4/025; H04W 4/08; H04W 52/365; H04W 60/04; H04W 72/08

See application file for complete search history.

(56) References Cited

U.S. PATENT DOCUMENTS

| | | | |
|---|---|---|---|
| 2014/0228017 A1* | 8/2014 | Chang | H04W 24/10 455/422.1 |
| 2015/0031308 A1 | 1/2015 | Schmidt et al. | |
| 2016/0157106 A1* | 6/2016 | Randall | H04W 16/18 455/446 |
| 2018/0020363 A1* | 1/2018 | Faxer | H04L 5/005 |
| 2019/0116506 A1* | 4/2019 | Bendlin | H04W 64/003 |
| 2020/0275291 A1* | 8/2020 | Moisio | H04W 24/08 |

\* cited by examiner

DYNAMIC ADAPTATION OF MOBILE NETWORK COVERAGE

FIELD OF THE DISCLOSURE

The present disclosure generally relates to mobile communications networks and, in particular, to adapting radio coverage area in response to dynamic changes in user equipment or services.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Mobile network providers desire to provide optimal cellular coverage for users of the cellular/mobile network services. Mobile network providers have deployed universal mobile telecommunications system (UMTS) nodes and/or high-speed packet access (HSPA) nodes to provide coverage to the users of their network. These deployments have been augmented by the deployment of third generation partnership project (3GPP) long term evolution (LTE) coverage (e.g., 4G/LTE) to increase network performance, provide new services and so on. New and planned deployment of 5G New Radio (5G NR) and related technologies provides further improvements in network performance as well new or improved network services.

Mobile network providers try to avoid coverage holes or gaps in their cellular networks. Such coverage holes may be caused by various issues such as poor designs, changing design dynamics, inaccurate design parameters, capacity and cell edge changes over time, performance optimization and so on.

SUMMARY

Various deficiencies in the prior art are addressed by systems, methods, architectures, mechanisms and apparatus for dynamically adapting category-specific radio coverage area of a mobile network using information received from corresponding common-category user equipment (UE) active within the mobile network indicative of UE capability, UE location, and UE quality of service (QoS) such that category-specific service edge locations and corresponding category-specific coverage gaps therebetween may be determined and automatically mitigated by optimizing or augmenting deployed network equipment.

A method of adapting radio coverage area of a mobile network according to one embodiment comprises: at mobile network provider equipment (PE), receiving, for each of a plurality of common-category user equipment (UE) active within the mobile network, communications indicative of UE capability, UE location, and UE quality of service (QoS); correlating, for each common-category UE, contemporaneously received UE location and service information indicative of a threshold level of service to derive therefrom category-specific service edge locations; determining, using the category-specific service edge locations, corresponding category-specific coverage gaps; and automatically adapting network node equipment such that the category-specific coverage gaps are reduced in size.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
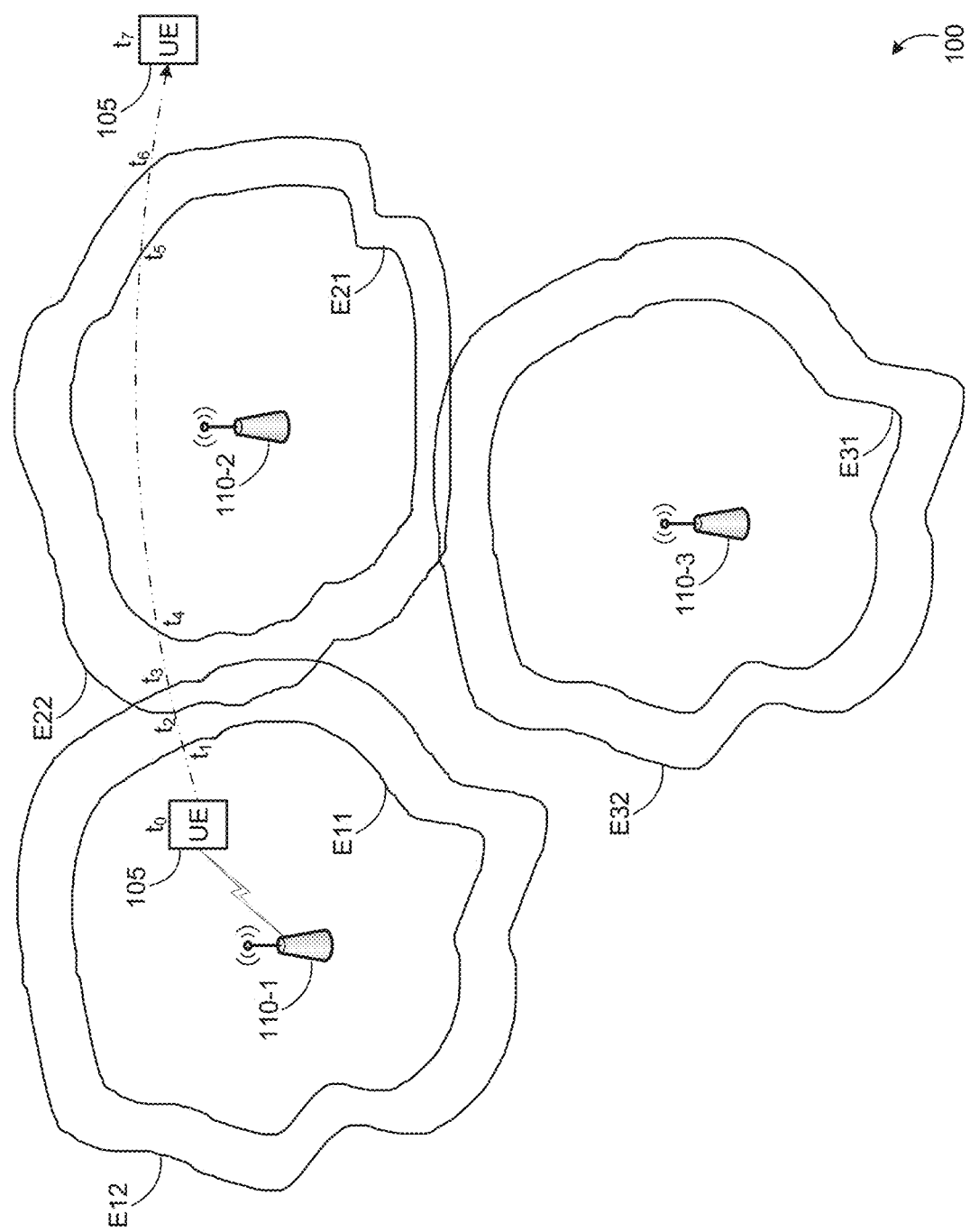
FIG. 1 graphically depicts a portion of a wireless network useful in illustrating a problem addressed by the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Mobile network providers desire to provide optimal cellular coverage for users of the cellular/mobile network services. Mobile network providers have deployed universal mobile telecommunications system (UMTS) nodes and/or high speed packet access (HSPA) nodes to provide coverage to the users of their network. These deployments have been augmented by the deployment of third generation partnership project (3GPP) long term evolution (LTE) coverage (e.g., 4G/LTE) to increase network performance, provide new services and so on. New and planned deployment of 5G New Radio (5G NR) and related technologies provides further improvements in network performance as well new or improved network services.

Mobile network providers try to avoid coverage holes or gaps in their cellular networks. Such coverage holes may be caused by various issues such as poor design (e.g., unsuitable antenna parameters, or inadequate radio frequency (RF) planning), changing design dynamics, inaccurate design parameters, capacity and cell edge changes over time, physical obstructions (such as new buildings and hills) and so on. Coverage holes can exist in a single cell or node of a cellular network, or in the vicinity of a border between adjacent cells (i.e., at a cell edge). At a cell edge, a UE or a network can perform a handover process to move the UE from one cell to another cell in the cellular network. A handover of the UE from one cell to another may fail because of the coverage holes between the cells.

Generally speaking, a coverage hole is an area in which the signal strength of a cellular network experienced by a user equipment (UE) is insufficient to maintain connectivity and there is no coverage from an alternative cell. For example, a coverage hole can exist in an area where a signal to noise ratio (SNR) or a signal to interference plus noise ratio (SINR) of a serving and neighboring cells, such as 3GPP LTE cells, is below a threshold level to maintain basic service.

Upon identifying coverage holes within a mobile network, the network provider may add more cells to the network by adding more provider equipment (PE) supporting additional cells; namely, additional UMTS nodes, HSPA nodes, base stations, eNodeBs and the like, along with respective backend communications links. The network provider may also modify the performance characteristics of existing nodes if this is sufficient to provide an appropriate level of network services.

The various embodiments will primarily be discussed within the context of a 3GPP LTE mobile network utilizing compatible PE and UE. However, it will be appreciated by those skilled in the art and informed by the present teaching that the various embodiments are applicable to older mobile network technologies, and especially well-suited for use in the present and upcoming deployments of 5G cellular network equipment and the use of such equipment to support both existing and new network services. As such, it is contemplated that the various embodiments disclosed herein are applicable to all of the current and currently contemplated mobile and cellular networking technologies, services and applications.

FIG. 1 graphically depicts a portion of a wireless network useful in illustrating a problem addressed by the various embodiments. Specifically, FIG. 1 depicts a portion of a 4G/LTE/5G wireless network comprising eNodeBs 110-1 through 110-3, each of which is depicted as having a first or smaller footprint defined by an inner footprint edge (E11-E31) and a second or larger footprint defined by an outer footprint edge (E12-E32). The first and second footprints may be associated with first and second types of mobile devices such as smartphones and laptops, or high quality smartphones and lower quality smartphones. The first and second footprints may also be associated with first and second types of mobile services, such as voice communications, video streaming, Internet of Things (IoT) services and so on. The first and second footprints may also be associated with first and second types of modulation schemes used by mobile devices.

The inventors have recognized that cellular network coverage holes or gaps may be of differing size or shape depending on the type of user equipment (UE) accessing the network services as well as the type of services being accessed by the UE. Specifically, the UE accessing network services may comprises different types of feature phones, smart phones and other mobile devices. Each type of UE has a respective capability level or operating characteristics that determine for the UE a respective effective range from a base station or eNodeB at which satisfactory wireless services are provided to the UE. That is, each type of UE may have its own effective footprint with respect to the same base station or eNodeB.

Specifically, each UE device type, device operating parameter (e.g., modulation scheme), mobile service and so on may be associated with a respective coverage footprint defined by a respective footprint edge around or proximate a cellular node. Further, different combinations of device type, device operating parameters, mobile service and so on may result in numerous other coverage footprints defined by respective footprint edges around or proximate the cellular node.

Referring to FIG. 1, a UE 105 is depicted as proximate first cell node 110-1 at a time $t_0$. And moving through coverage areas of first cell node 110-1 and second cell node 110-2 until a time $t_7$. If the UE device type, device operating parameters, consumed mobile service and so on associated with UE 105 is such that the outer (larger) coverage footprints of nodes 110-1 (i.e., E12) and 110-2 (i.e., E22) represent acceptable service coverage areas, then UE 105 retains acceptable service until passing beyond the edge of the outer coverage footprint E22 of second node 110-2 at time $t_6$. Otherwise, the UE 105 retains acceptable service until such time as EU 105 passes into a gap between coverage footprints associated with the UE device type, device operating parameters, consumed mobile services and so on.

Various embodiments contemplate the use of contemporaneously reported UE information to identify device-specific, service-specific or combined device/service-specific footprint edges such that respective service holes/gaps between such footprint edges may be addressed via network optimization, augmentation and/or other remedial measures.

For example, changes may be made to antenna azimuth or tilt for one or more antennae at a cellular node or adjoining cellular nodes.

Figure 2:
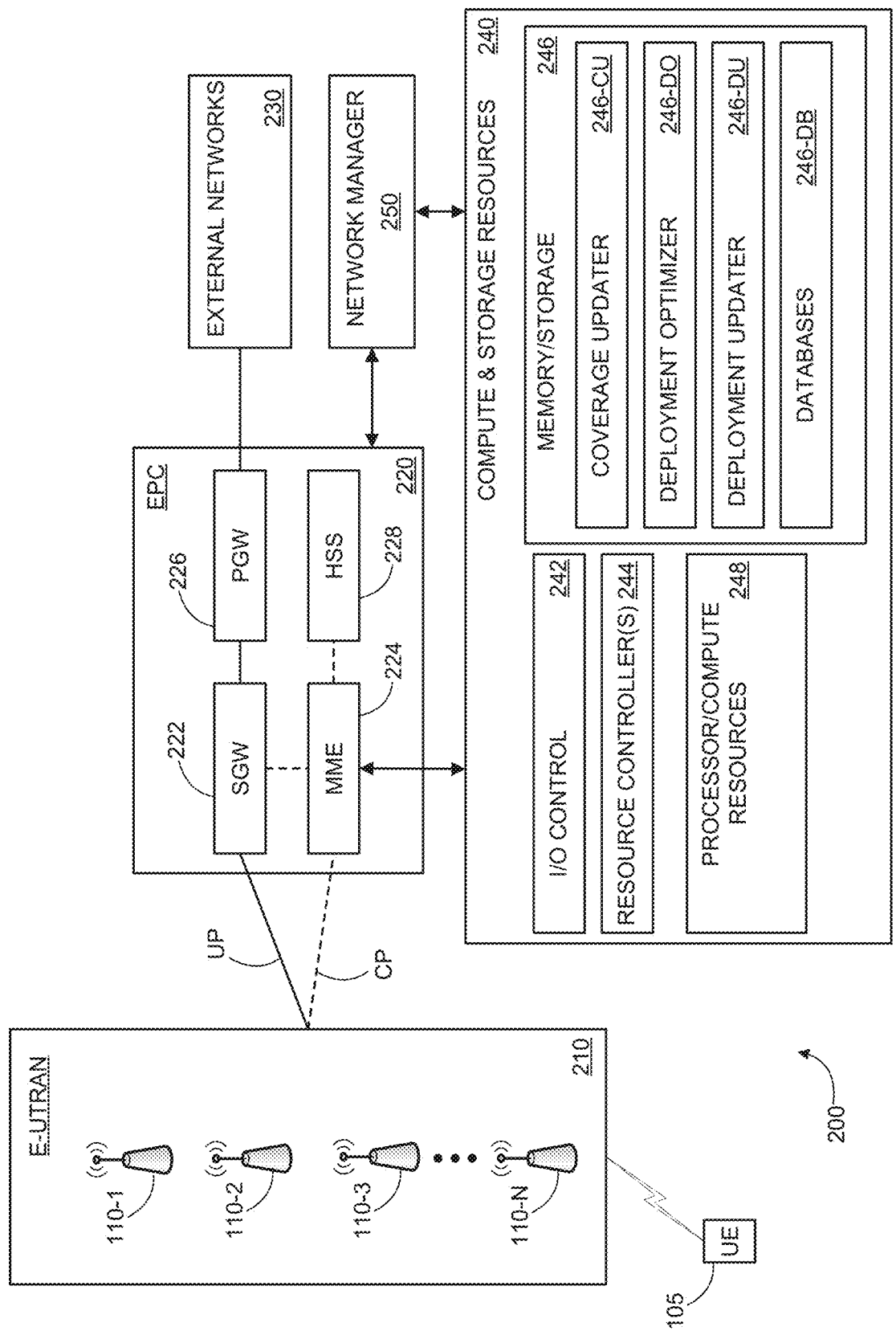
FIG. 2 depicts a simplified network services architecture suitable for use in various embodiments.

FIG. 2 depicts a simplified network services architecture suitable for use in various embodiments. Specifically, a UE 105 in communication with one or more nodes 110 of a E-UTRAN (LTE access network) 210 is connected thereby to an evolved packet core (EPC) 220 which provides network services from/to external networks 230.

As depicted, the EPC comprises four network elements; namely, a Serving Gateway (SGW) 222, a Mobility Management Entity (MME) 224, a Packet Data Network (PDN) Gateway (PGW) 226, and a Home Subscriber Server (HSS) 228.

The SGW 222 and PGW 226 handle user data or user plane (UP) functions; they transport the internet protocol (IP) data traffic (i.e., incoming and outgoing packets) between the User Equipment (UE) 105 and the external networks 230. The external networks 230 may comprise any external network, such as an IP Multimedia Core Network Subsystem (IMS).

The SGW 222 is the point of interconnect between the radio-side (e.g., a E-UTRAN 210 as depicted or some other wireless network) and the EPC 220. As its name indicates, this gateway serves the UE by routing the incoming and outgoing IP packets. The SGW 222 is the anchor point for intra-LTE mobility (i.e. in case of handover between eNodeBs 110) and between LTE and other 3GPP accesses. The SGW 222 is logically connected to the PGW 226.

The PGW 226 is the point of interconnect for routing packets between the EPC 220 and external packet data networks (e.g., Internet Protocol (IP) networks) 230. The PGW also performs various functions such as IP address/IP prefix allocation, policy control and charging, and other functions.

The MME 224 and HSS 228 handle user signaling or control plane (CP) functions; they process signaling related to mobility and security for E-UTRAN 210 access. The MME 224 is responsible for the tracking and the paging of UE in idle-mode. It is the termination point of the Non-Access Stratum (NAS). The HSS 228 comprises a database that contains user-related and subscriber-related information, and provides support functions in mobility management, call and session setup, user authentication, access authorization, and other functions. It is noted that the SGW 222 may also be used to handle some control plane signaling in various configurations.

An EPC control plane signaling path 51 may be used to provide information such as UE messages or signaling may be provided to the MME 224 or SGW 222. The MME 224 may also interact with various other EPC nodes such as the HSS 228 and SGW 222 to determine information helpful in generating reports and/or providing other information for managing the various networks in implementing the embodiments described herein.

As depicted in FIG. 2, the EPC 220 communicates with a network manager 250, illustratively a general purpose computer server, network operations center (NOC) or other provider equipment configured to perform various network management functions such as described herein with respect to the embodiments. For example, UE statistics received by the EPC 220 such as by the MME 224 may be provided to the network manager 250 for further processing in accordance with the embodiments, such as by local processing (i.e., at the network manager 250) or by processing at a compute and storage resources entity 240. In various embodiments, one or more entities within the EPC 220 (e.g., MME 224, SGW 222 or some other entity) communicate directly with the compute and storage resources entity 240 such that the network manager 250 is not needed.

The compute and storage resources entity 240 comprises, illustratively, a data center or ad hoc group of compute/memory resources capable of performing the various functions described herein. It is noted that the computer and storage resources 240 are depicted as a separate entity with respect to the EPC 220. However, in various embodiments, the computer and storage resources 240 may be included within or implemented by provider equipment forming the EPC 220. Further, in various embodiments the functions of the network manager 250 and compute and storage resources entity 240 are combined.

In various embodiments, the computing storage resources 240 comprise an ad-hoc group of compute/memory resources, compute/memory resources associated with one or more data centers, or combination thereof managed by a cloud computing platform such as via the OpenStack platform. The compute/memory resources may include private compute/memory resources such as those owned by the network services provider and having increased availability at off-peak hours of the day. The compute/memory resources may comprise purchased and/or incrementally deployed infrastructure-as-a-service (IaaS) resources. Various "big data" compute/memory resource configurations may be utilized.

As depicted in FIG. 2, the compute and storage resources entity 240 are shown in a simplified form including processor/compute resources 248 (e.g., processors or portions thereof, high performance computing devices and so on such as in a data center or ad-hoc network), memory/storage resources 246 (solid state, optical and/or magnetic memory resources or portions thereof, high performance storage networks or resources and so on such as in a data center or ad-hoc network), and one or more resource controllers 244 configured for managing the memory/storage resources 240 and processor/compute resources 248, such as an OpenStack platform/controller, an ad-hoc network management system, one or hypervisors and/or other virtualized network element controllers or cloud management systems. Also depicted is an input/output (I/O) controller 242 configured for communicating with various service provider and management entities, including EPC 220 control plane entities such as the MME 224 and SGW 222, and (optionally) various other management entities/systems such as remote servers, network element management systems, network operations center systems and the like (not shown).

It will be appreciated that the functions, methods, databases and the like as depicted and described herein may be implemented in hardware and/or in a combination of software and hardware, e.g., using general purpose computers, one or more application specific integrated circuits (ASIC), and/or any other hardware equivalents. In one embodiment, the various functions, methodologies, databases or portions thereof may be loaded into memory/storage resources 246 and executed by processor/compute resources 248 to implement the functions as discussed herein. Specifically, memory/storage 246 is depicted as storing instructions and databases associated with a coverage updater module 246-CU, a deployment optimizer module 246-DO, a deployment updater module 246-DU, and various databases 246-DB.

It is noted that the databases 246-DB may include all of the information necessary to describe and manage network 210 and EPC 220, as well as the information described and utilized in accordance with the various embodiments. Such information may comprise, illustratively, information pertaining to deployed networks such as topology maps, topology models, deployed equipment listings (e.g., provider and use equipment), current and historic network and equipment performance data (e.g., time-stamped performance data along with related information such as weather conditions, network loading, stresses and so on), information received from user equipment, determined/calculated coverage footprints and corresponding coverage edges (e.g., category-based coverage footprint/edge information) and so on. Such information may also comprise environmental information useful in understanding signal propagation proximate deployed or proposed network nodes, including terrain information, weather information, construction scope/materials information, and other information pertinent to understanding challenges to effective signal propagation within the geographic area (e.g., sources of signal path loss, signal scattering/reflection and so on).

Thus, the various functions, methodologies, databases or portions thereof (including associated data structures) may be stored on a computer readable storage medium (e.g., RAM memory, magnetic or optical drives and the like) from which they may be retrieved and executed/implemented.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

The compute and storage resources entity 240 operates to process information received from multiple UE 105 within the wireless network 210 to (1) identify device-specific, service-specific or combined device/service-specific footprint edges indicative of service holes/gaps between such footprint edges such that differing effective coverage areas may be determined/updated with respect to the wireless network 210, such as in accordance with the coverage updater module 246-CU; (2) determine various optimizations of deployed equipment such that service holes/gaps associated with the determined/updated effective coverage areas may be reduced or eliminated, such as in accordance with the deployment optimizer module 246-DO; and (3) determine infrastructure updates (and any optimizations) to the wireless network 210 that will reduce or eliminate the service holes/gaps associated with the determined/updated effective coverage areas, such as in accordance with the deployment updater module 246-DU. In particular, compute and storage resources entity 240 operates to determine network optimizations, network or infrastructure augmentation, and/or other remedial measures suitable for reducing or eliminating service holes/gaps associated with the determined/updated effective coverage areas, which areas may have a device-specific, service-specific or combined device/service-specific footprint.

Figure 3:
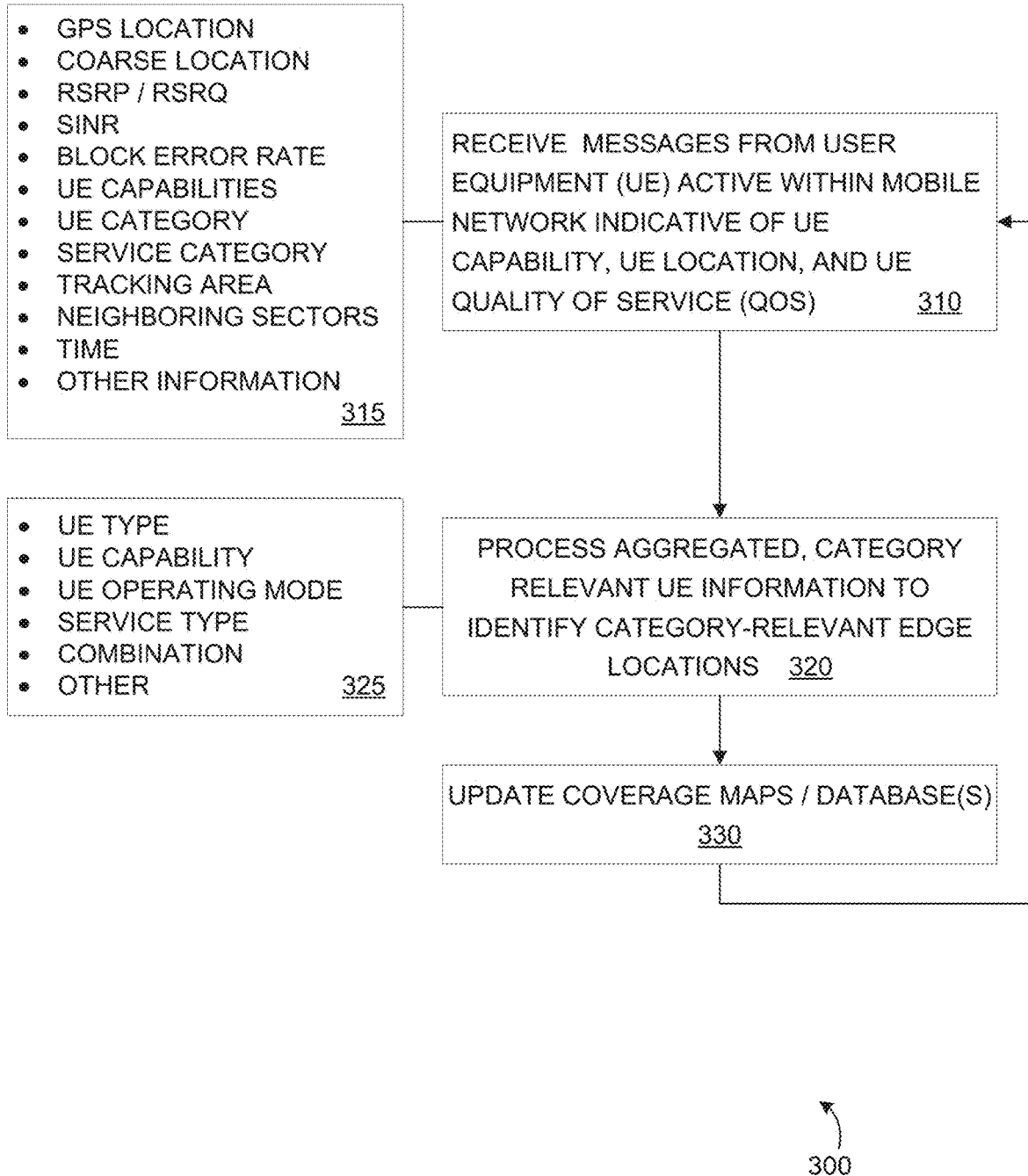
FIG. 3 depicts a flow diagram of a coverage updating method according to an embodiment.

FIG. 3 depicts a flow diagram of a coverage updating method according to an embodiment. Specifically, the method 300 of FIG. 3 is suitable for use in implementing the coverage updater module 246-CU depicted above with respect to FIG. 2.

At step 310, PE such as the MME 224 or SGW 222 receives messages and/or signaling (e.g., via EPC control plane signal path 51) from active UE within the mobile network 210; such messages and/or signaling being indicative of, or related to, UE location, UE capability, and UE quality of service (QoS). Referring to box 315, the received UE messages/signaling include location information such as fine GPS location or coarse location (e.g., cell tower proximity/triangulation), UE capability/category information such as UE make, model, features, sensitivity, mode of operation or selected operating parameters (e.g., modulation scheme, energy saving mode, performance mode, battery status, active application(s) running and so on) and key network parameters/QoS-related information such as Packet Data Channel (PDCH) Signal-to-Interference-plus-Noise Ratio (SINR), Reference Signal Received Power (RSRP), Reference Signal Received Quality (RSRQ), modulation supported for a given SINR, Block Error Rate (BLER), tracking area, neighboring sectors, timestamp, and/or other information, alone or in any combination. In various embodiments, the primary information useful in identifying coverage area edges/hole is the GPS location, RSRP, SINR, UE capability and UE category information.

At step 320, aggregated category relevant UE information is processed to identify therein category-relevant edge locations and, by extension, category-relevant footprint associated with the various cell nodes 110 in the network 210. Referring to box 325, categories may be defined in terms of UE type, UE capability, UE operating mode, service type, and/or any combination thereof. Other categories may also be defined.

It is noted that management entities within the EPC 220 stores significant information about UE accessing services via the network 210. Such information includes identifying information such as the International Mobile Equipment Identity (IMEI) number, international mobile subscriber identity (IMSI) number and/or other identifying information associated with each UE.

Step 320 correlates UE location/time information with edge-indicative QoS metrics for each of the plurality of active UE within the network 210. Edge-indicative QoS metrics may comprise threshold service level, such as an ability to support traffic at a predefined data rate (e.g., 512 kbps), an ability to support traffic at a predefined data rate without forward error correction (FEC) or other error correction processing exceeding a predefined threshold level or a normative level (e.g., network, cell, or other average level).

It is noted that UE location, signal received and other parameters are reported by the UEs back to the provider equipment of the network. This reported information enables the provider equipment to perform various functions as described herein, such as correlating UE-reported information with propagation generator information to accurately quantify propagations. Edge-indicative metrics may comprise, or be derived from, any of the Packet Data Channel (PDCH) Signal-to-Interference-plus-Noise Ratio (SINR), modulation supported for a given SINR, Reference Signal Received Power (RSRP), Reference Signal Received Quality (RSRQ), Block Error Rate (BLER), UE sensitivity and the like may be used alone or in any combination.

Each UE category may be used to determine the cell edge for a given type or category of cell phones. Network optimizations, reconfigurations, deployments and the like may be made to change a determined cell edge based on technical as well as business factors, such as the market share of specific/preferred devices (e.g., devices predominant in that market), cell edge defined by device type, service type and the like (or a combination thereof). Design/planning and capacity may be adapted based on application usage. For example, if usage of certain type of application is higher in a given cluster/city then subsequent design and optimized may be directed towards the application type as well as the relevant UE types.

It is noted that cell edges, and related network design/optimization, are often defined/operated for the "worst" cell phone carried by an operator. However, in some areas where a smaller percentage of these devices are used, the various embodiments may determine that the concentration of such devices is very small or none in a given cluster/city, the design and optimization focus may be directed toward other devices.

Thus, the edges of coverage areas may be defined by the geographic locations associated with any of the edge-indicative metrics where one or more of such metrics drop below a respective threshold level or rise above a respective threshold level, such as with respect to different types of mobile devices. In the manner, category-specific or device-specific coverage areas and/or coverage area edges may be defined. It is noted that specific devices or device categories may be major contributors to network traffic and overall network performance. Further, as will be discussed herein, various embodiments contemplate that network coverage and/or network equipment configuration/orientation may be changed to improve the overall efficiency of the network in an ongoing or dynamic manner, even if the original (static) design of the network ws directed to the worst performing UE category used within the network.

At step 330, one or coverage maps/databases are updated in response to the identified category-relevant edge locations. In this manner, category-based coverage maps and related databases are dynamically updated in response to aggregated UE information.

Generally speaking, the method 300 of FIG. 3 uses cell phone network reporting data plus location data to identify category-specific edges associated with coverage footprint of cell nodes such as base stations, eNodeBs and the like such that, illustratively, phone-specific, service-specific or another category-specific maps of network operations may be determined with respect to the collected UE edge information for network management purposes (e.g., studying changes in such maps with respect to weather, season, time of day, urban sprawl and the like). The data received from mobile devices may be compared to threshold levels such as data rates, error correction rates and the like. Adaptations to the data may be made based upon mobile device movements such as with a mobile device in accord driving through a cellular coverage area.

In various embodiments, key network parameters provided by the UE are used to determine when UE such as a cell phone reaches a cell edge threshold, such as a threshold SINR (illustratively −118 dBm) corresponding to a specific network load (illustratively 60%) such that appropriate QoS cannot be maintained (illustratively, 512 Kbps data rate). The locations associated with multiple instances of such a cell edge threshold may by used to define or draw a spatial map of the cell edge. Further, such cell edge spatial maps may be drawn for different UE categories, and since the identity of each UE is known by IMEI or IMSI data, the respective categories of the identified UE may be used for this mapping process.

In various embodiments, the thresholds for these mapping specific UE is defined by tuning a pre-determined threshold. As the mapping process is iterated over time, it is noted that the boundaries start to form more prominently along the roads and side walks and the like subscribers holding UE move around.

As the speed of subscriber motion increases (e.g., walking vs riding in an automobile) higher path loss may be experienced by the subscriber's UE. Further, movement in certain directions may also result in higher path loss due to loss attributable to the subscriber's body. In some embodiments, the threshold values indicative of a coverage edge are adjusted to compensate for the path loss due to speed and/or the path loss due to UE position with respect to the body of the user.

The various databases may be used to map UEs by their IMEI or IMSI to UE Categories, determine cell edges by using location, and separate slow moving subscribers from fast moving subscribers.

Figure 4:
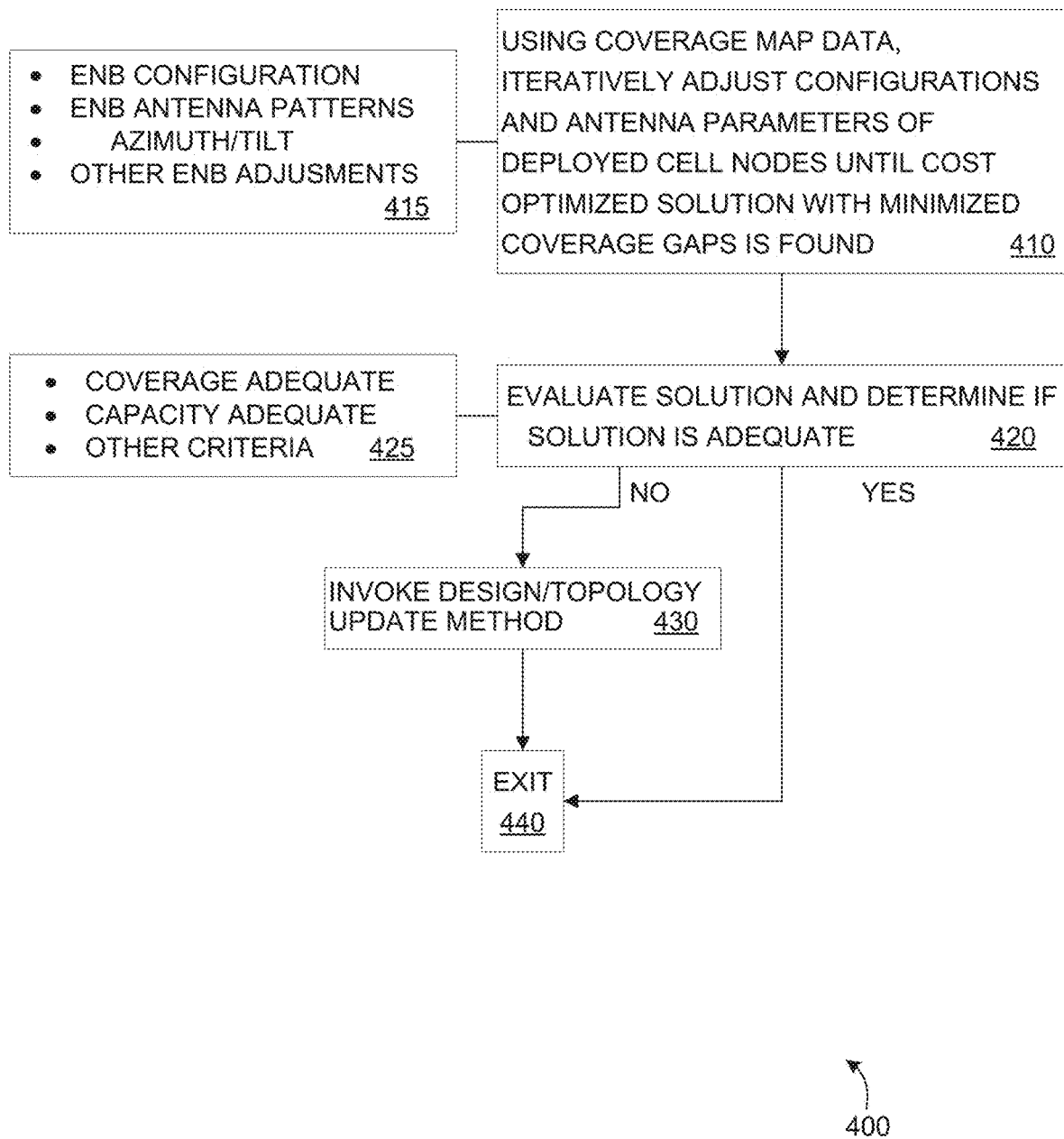
FIG. 4 depicts a flow diagram of a network optimizing method according to an embodiment.

FIG. 4 depicts a flow diagram of a network optimization method according to an embodiment. Specifically, the method 400 of FIG. 4 is suitable for use in implementing the deployment optimizer module 246-DO depicted above with respect to FIG. 2. Generally speaking, the method 400 of FIG. 4 is directed to automated optimization operating parameters of cellular node equipment in a cellular network exhibiting coverage gaps (e.g., category-specific coverage gaps) to mitigate such coverage gaps.

At step 410, using coverage map data, the configurations and/or antenna parameters of deployed cell nodes are adjusted until a cost optimized solution providing minimized or eliminated coverage gaps is found. Referring to box 415, such adjustments may comprise eNodeB configuration adjustments, antenna pattern adjustments (e.g., azimuth and/or tilt) as well as other adjustments.

At step 420, the solution is evaluated and its adequacy is determined. That is, at step 420, the cost optimized solution is evaluated to determine if the amount of coverage gap mitigation is sufficient to deem the coverage gap closed or at least deem the coverage gap compatible with service level agreement (SLA), quality of service (QoS) or other requirements. Referring to box 425, the adequacy of the solution may be evaluated with respect to coverage, capacity and/or other criteria.

The "adequacy" of a reduction in (or mitigation thereof) a coverage gap or category-specific coverage gap is defined in terms of threshold(s) or minimum coverage level(s) associated with the respective coverage gap or category-specific coverage gap, which may be defined using any of a plurality of measurements alone or in any combination. For example, gap distance or coverage area associated with service level (QoS) may be considered such as a no-service gap or a minimum/low service gap or a full service gap not exceeding some distance (e.g., 100 m, 500 m, 1 km and the like). Similarly, thresholds may be defined in terms of network capacity, network performance, number of subscribers covered, number of additional subscribers that may be admitted, service levels corresponding to service level agreement (SLA) requirements and so on.

If the evaluated solution is adequate, then the method exits at step 440. Otherwise, a design/topology update method is invoked at step 430. An exemplary design/topology update method is described in more detail below with respect to FIG. 5.

Figure 5:
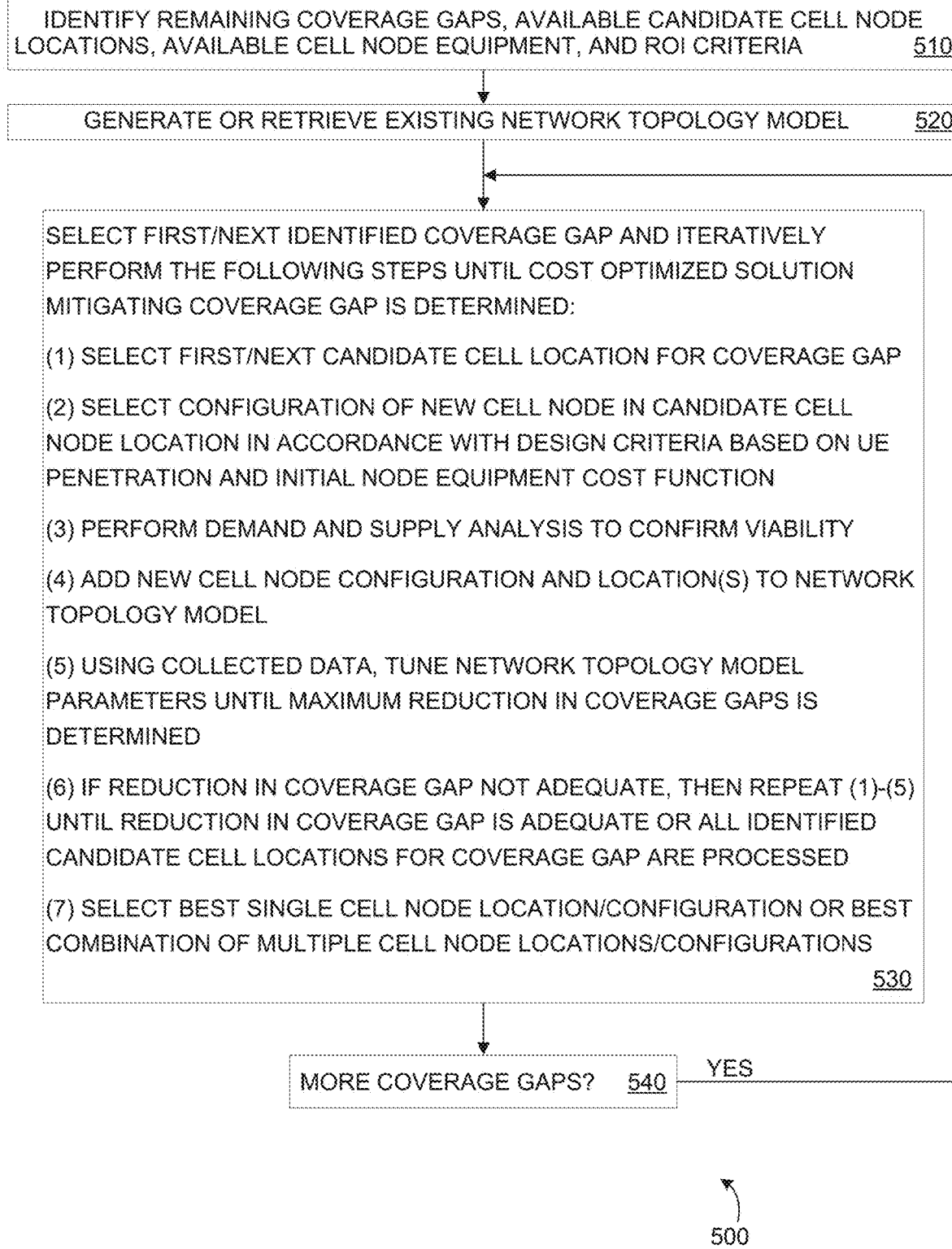
FIG. 5 depicts a flow diagram of a network updating method according to an embodiment.

FIG. 5 depicts a flow diagram of a network design/topology update method according to an embodiment. Specifically, the method 500 of FIG. 5 is suitable for use in implementing the deployment updater module 246-DU depicted above with respect to FIG. 2. Generally speaking, the method 500 of FIG. 5 is directed to automatically determining location and configuration of new eNodeB or base station cell nodes for use in a deployed cellular network exhibiting coverage gaps (e.g., category-specific coverage gaps) that are not addressed by automated optimization techniques such as those described above with respect to FIG. 4.

At step 510, the method identifies remaining coverage gaps, available candidate cell node locations relevant to such coverage gaps, available cell node equipment that may be deployed, return on investment (ROI) criteria and/or other factors.

At step 520, a network topology model is retrieved or generated. The network topology model represents at least those portions of the network relevant to the coverage gaps to be mitigated. The network topology model includes topographical and environmental information indicative of local path loss/transmissibility, cell node equipment (eNodeB/base station), empirically determined category-based coverage footprint and so on.

Exemplary techniques for determining path loss and coverage area in the topology model will be discussed in more detail below with respect to FIGS. 6-7. Briefly, in various embodiments, the topology model may be used to determine the expected coverage area of cell node equipment to be reconfigured or installed at a particular location. The expected coverage area may be divided into a plurality of sub-areas or bins where UE may be located and receive network services at a sufficient QoS level. These sub-areas or bins are determined using path loss data. Specifically, for each coverage area to be serviced by a cell node, a determination is made of expected path loss from the cell node equipment to each of a plurality of sub-areas forming the coverage area, each sub-area being associated with any respective parameters impactful to signal propagation therethrough, each sub-area having associated with it a respective path loss determined as the summation of the expected path loss of all sub-areas between the cell node and the sub-area for the lowest loss path of a signal therethrough. The sub-areas or bins capable of supporting service to UE are considered to be part of the coverage area (whereas other sub-areas or bins are not), thereby defining the expected coverage area for the topology model.

At step 530, an iterative process is performed to address a first or next identified coverage gap. Specifically, at step 530 a first or next identified coverage gap is selected and a sequence of steps are iteratively performed until a cost optimized solution mitigating the selected coverage gap has been determined.

At a first step, a first or next candidate cell location associated with the coverage gap is selected as a candidate node location.

At a second step, a configuration of a new cell node for the candidate node location is selected in accordance with design criteria based on UE penetration, initial node equipment costs and so on. For example, given that a network operator may have several types of portable or emergency node equipment on standby, a selection of the appropriate type of portable or emergency node equipment may be made based upon compatibility, capacity, and other factors.

At a third step, a demand and supply analysis is performed to confirm viability of the selected cell node configuration. That is, given the type(s) of UE and utilized network services, the necessary capacity and so on, a determination is made as to whether the selected cell node configuration a viable solution to the identified coverage gap.

At a fourth step, the new cell node configuration and location (or locations of more than one new node is contemplated) is added to the network topology model.

At a fifth step, and using collected data, the network topology model parameters are tuned until a maximum reduction in the selected coverage gap is determined. That is, using existing data such as received UE information, path loss modeling and so on, various parameters associated with a network topology are adjusted until a maximum reduction the selected coverage gap is determined. Such parameters may include adjustments to configuration or operational characteristics of existing node equipment or proposed node equipment.

At a sixth step, a determination is made as to whether the expected reduction in the selected coverage gap is adequate. That is, whether the selected coverage gap is adequately reduced or eliminated due to the deployment of the new cell node configuration at the selected location, the configuration and operational characteristic adjustments made to the new cell node equipment, any configuration and operational characteristic adjustments made to existing node equipment and/or any factors contemplated in the prior steps.

If the expected reduction in the selected coverage gap is adequate, then at step 540 a determination is made as to whether more coverage gaps exist. If more coverage gaps exist, then step 530 is repeated to generate an adequate solution for mitigating a next identified coverage gap.

The "adequacy" of a reduction in (or mitigation thereof) a coverage gap or category-specific coverage gap is defined in terms of threshold(s) or minimum coverage level(s) associated with the respective coverage gap or category-specific coverage gap, which may be defined using any of a plurality of measurements alone or in any combination. For example, gap distance or coverage area associated with service level (QoS) may be considered such as a no-service gap or a minimum/low service gap or a full service gap not exceeding some distance (e.g., 100 m, 500 m, 1 km and the like). Similarly, thresholds may be defined in terms of network capacity, network performance, number of subscribers covered, number of additional subscribers that may be admitted, service levels corresponding to service level agreement (SLA) requirements and so on.

If the expected reduction in the selected coverage gap is not adequate, then the first through fifth steps are repeated. That is, a new candidate location associated with the selected coverage gap is associated with a new cell node configuration and the network topology model is correspondingly updated and tuned to examine this result. It is noted that various steps may be performed for multiple locations as well as multiple types of proposed node equipment.

It is noted that while the methods 400 of FIG. 4 and 500 of FIG. 5 depict specific sequences of steps or functions, it is not necessary that these steps/functions be performed in the depicted sequence. Specifically, the sequences of steps or functions of the methods 400 of FIG. 4 and 500 of FIG. 5 may be performed in a different order and/or simultaneously as appropriate, and depending upon the availability of predicate information necessary to perform a specific step/function.

In various embodiments the algorithms, methods, functions and the like discussed herein, such as the methods 400 of FIG. 4 and 500 of FIG. 5, are implemented using a "big data" approach in which numerous sources of information are accessed, and numerous computing resources invoke processes utilizing the sources of information. For example, high-capacity computer memory allocations may be made to enable multiple simultaneous or contemporaneous processing threads such that solutions may be converged upon more rapidly. Such multiple simultaneous or contemporaneous processing may be used to process design-related criteria or portions thereof such as described herein, including candidate cell locations, type of available cell equipment, ROI criteria, cell design criteria such as based on UE penetration, cell equipment cost function, demand and supply analysis, model tuning based on collected data and so on. It is noted that multivariate analysis may be performed wherein for each coverage gap, or for each category-specific coverage gap of interest, multiple locations and node equipment configurations may be simultaneously processed to arrive at many possible outcomes, where a best outcome of the many possible outcomes may be selected as an ultimate solution for deployment.

In various embodiments, the network provider may require the use of UE having minimum capability levels, or of a particular brand, or distinguishable in some other manner such that category-specific coverage gaps of the specified UE are prioritized in terms of the automatic optimizations and deployment upgrades discussed herein.

FIGS. 6A-6D depict real world examples of environmental information useful in defining path loss attributes of a particular area such that signal propagation within the area may be better understood. Specifically, each of multiple types of environmental information may be used to define corresponding impact to signal propagation and, therefore, may be used to populate databases such that signal propagation challenges of various areas may be factored into network models. Such challenges include signal path loss, reflection, absorption and the like due to buildings, building materials, terrain features, terrain height and so on.

Figure 6A:
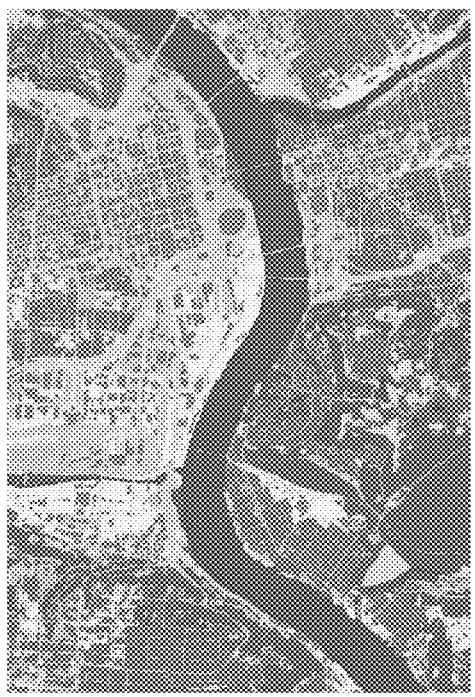
FIGS. 6A-6D depict real world examples of environmental information useful in defining path loss attributes of a particular area such that signal propagation within the area may be better understood.

FIG. 6A depicts an orthogonal view of an area including various structures color-coded according to height. This information may be obtained using aerial photography, survey data and the like, and may be included within a clutter database.

Figure 6B:
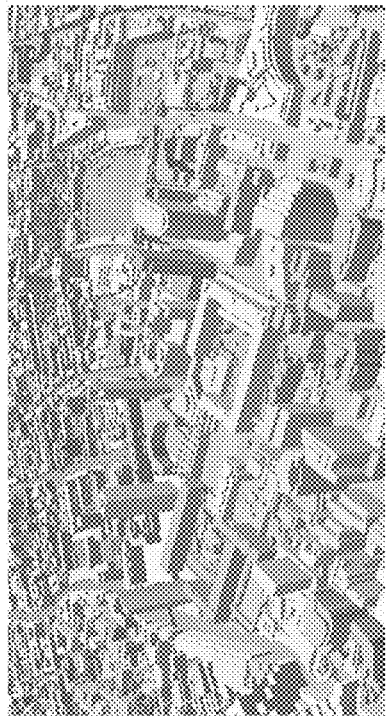

FIG. 6B depicts an overhead view of an area including various structures color-coded according to height. This information may be obtained using aerial photography, survey data and the like, and may be included within a clutter heights database.

Figure 6C:
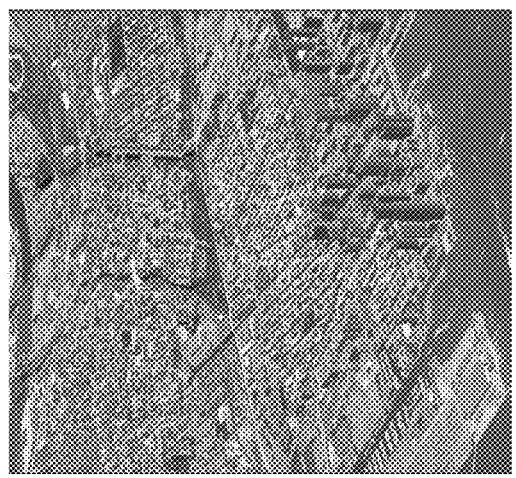

FIG. 6C depicts an orthogonal view of terrain elevation of an area. This information may be obtained using ground-based or aerial photography, survey data and the like, and may be included within a terrain database.

Figure 6D:
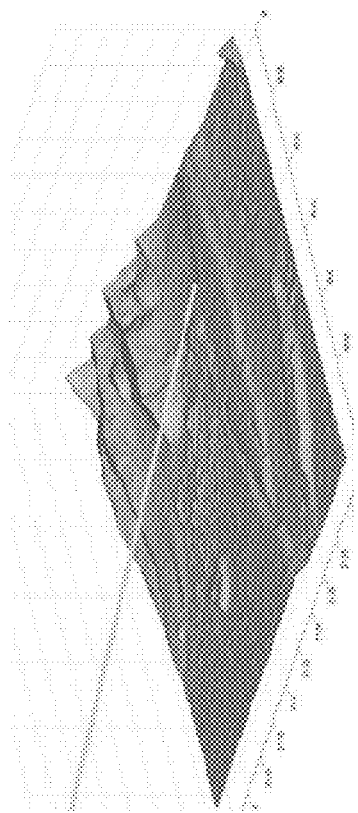

FIG. 6D depicts a view of a an area including various structures color-coded according to building material. This information may be obtained using aerial photography, survey data and so on along with building materials databases associated with the area.

The above-described information and corresponding databases are useful in understanding and quantifying signal propagation proximate deployed or proposed network nodes where terrain information, weather information, construction scope/materials information, and other information pertinent to understanding the challenges to effective signal propagation within the geographic area (e.g., sources of signal path loss, signal scattering/reflection and so on).

Figure 7:
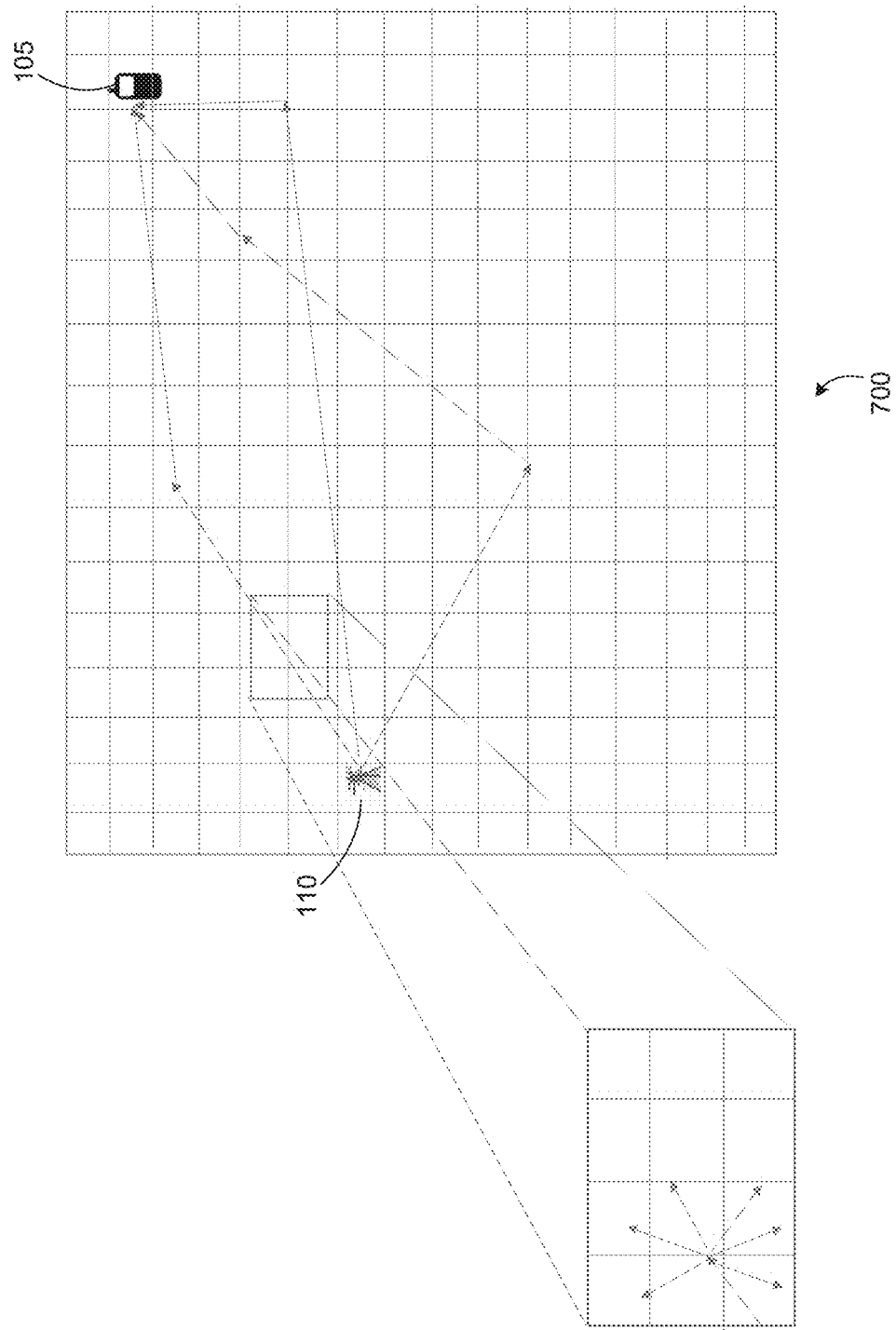
FIG. 7 graphically depicts a signal propagation modeling method according to an embodiment.

FIG. 7 graphically depicts a signal propagation modeling method according to an embodiment. Specifically, the method 700 of FIG. 7 is suitable for use in determining signal propagation associated with existing or proposed cell nodes in a network topology model, and finds particular utility in determining whether an identified coverage area gap is adequately mitigated by a proposed change of network topology/infrastructure. The signal propagation modeling method 700 is useful in understanding the impact to signal propagation within a cellular coverage area.

Specifically, the cellular coverage area is divided into sub-areas or bins of arbitrarily selected size, illustratively 1 m×1 m bins, 2 m×2 m bins and so on. Each bin is associated with one or more parameters impactful to signal propagation, such as discussed above with respect to FIG. 6 (illustratively, clutter information, terrain information, clutter height information and building materials information). These parameters are used to calculate for each bin a respective path loss (the loss associated with these parameters having been predefined or calculated using an empirical, deterministic, or hybrid model formula).

When calculating the loss imparted to a signal received at a bin, the signal level is calculated for all beams in 360 degrees, and calculated in the direction of the receiver (e.g., UE 105) with respect to the bin. In this manner, one or lower loss paths may be determined with respect to a signal propagated from a cell node 110 to UE 105.

As depicted in FIG. 7, a signal being transmitted by a cell node 110 to UE 105 traverses multiple bins within the cellular coverage area, each been having associated with it a corresponding impact to propagation of the signal based upon its respective calculated past lock. In the example of FIG. 7, the calculated path loss of the bins between cell node 110 and UE 105 are such that a likely path of the transmitted signal is not directed (i.e., not a straight line). Thus, given actual path loss data associated with each been, a reasonable approximation of one or likely signal paths and, importantly, losses associated with those signal paths may be determined. Where insufficient signal strength exists to provide service to the UE 105, may be determined that the UE 105 is outside the footprint of node 110 as discussed herein.

The signal propagation modeling method 700 advantageously accounts for variables such as SINR, cell type and various design criteria.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

The invention claimed is:

1. A method of adapting radio coverage area of a mobile network, comprising:

at mobile network provider equipment (PE), receiving, for each of a plurality of common-category user equipment (UE) active within the mobile network, communications indicative of UE capability, UE location, and UE quality of service (QoS);

correlating, for each common-category UE, contemporaneously received UE location and service information indicative of a threshold level of service to derive therefrom category-specific service edge locations;

determining, using said category-specific service edge locations, corresponding category-specific coverage gaps; and automatically adapting network node equipment such that said category-specific coverage gaps are reduced in size.

2. The method of claim 1, wherein said common-category UE comprises at least one of UE of the same type, UE of the same capability, and UE operating in the same operating mode.

3. The method of claim 1, wherein said category-specific service edge locations are associated with one or more of the following categories: UE type, UE capability, and UE operating mode.

4. The method of claim 1, wherein said common-category UE comprises UE of the same make and model.

5. The method of claim 1, wherein said UE communications indicative of UE QoS comprise one or more of Signal-to-Interference-plus-Noise Ratio (SINR), Reference Signal Received Power (RSRP), and Reference Signal Received Quality (RSRQ).

6. The method of claim 1, wherein said UE communications indicative of UE QoS comprise one or more of Packet Data Channel (PDCH) Signal-to-Interference-plus-Noise Ratio (SINR), Reference Signal Received Power (RSRP), and Reference Signal Received Quality (RSRQ), modulation supported for a given SINR, Block Error Rate (BLER), UE sensitivity, tracking area, and neighboring sectors.

7. The method of claim 1, wherein automatically adapting network node equipment comprises adapting one or both of node equipment configuration and node equipment antenna patterns.

8. The method of claim 1, wherein automatically adapting network node equipment comprises adjusting azimuth or tilt of one or more antennas associated with the node equipment.

9. The method of claim 1, further comprising automatically invoking a topology update routing in response to a determination that one or more category-specific coverage gaps exceed a threshold coverage level.

10. The method of claim 1, further comprising automatically invoking a topology update routing in response to a determination that one or more category-specific capacity gaps exceed a threshold coverage level.

11. The method of claim 1, further comprising:

identifying, for each remaining category-specific coverage gap, respective available candidate cell node locations; and for each category-specific coverage gap, performing the steps of:

(a) selecting a next available candidate cell node location;

(b) updating a model of the mobile network to include a cell node operating at the candidate cell node location;

(c) determining, using the model, a reduction in the category-specific coverage gap attributable to the cell node operating at the candidate cell location; and (d) repeating steps (a)-(c) if the category-specific coverage gap exceeds a threshold coverage level.

12. The method of claim 11, wherein the threshold coverage level comprises any of a no-service gap exceeding 0.5 km and a low-service gap distance exceeding 1 km.

13. The method of claim 11, wherein the threshold coverage level comprises any of a no-service gap exceeding 0.5 km and a low-service gap distance exceeding 1 km.

14. The method of claim 11, wherein:

said model of the mobile network includes, for each coverage area to be serviced by a cell node, a determination of expected path loss from the cell node equipment to each of a plurality of sub-areas forming the coverage area, each sub-area being associated with any respective parameters impactful to signal propagation therethrough, each sub-area having associated with it a respective path loss determined as the summation of the expected path loss of all sub-areas between the cell node and the sub-area for the lowest loss path of a signal therethrough.

15. The method of claim 14, wherein each sub-area comprises a 1 m by 1 m sub area.

16. The method of claim 14, wherein parameters impactful to signal propagation are determined for each sub-area using one or more of clutter information, terrain information, clutter height information and building materials information.

17. The method of claim 16, wherein parameters impactful to signal propagation further comprise weather and time information.

18. The method of claim 1, wherein said PE comprises at least one of a mobility management entity (MME), a Serving Gateway (SGW), and a Home Subscriber Server (HSS).

19. Network provider equipment configured to communicate with elements of a mobile network to adapt radio coverage area associated with the mobile network elements, the network provider equipment comprising compute and storage resources configured for:

receiving, for each of a plurality of common-category user equipment (UE) active within the mobile network, communications indicative of UE capability, UE location, and UE quality of service (QoS);

correlating, for each common-category UE, contemporaneously received UE location and service information indicative of a threshold level of service to derive therefrom category-specific service edge locations;

determining, using said category-specific service edge locations, corresponding category-specific coverage gaps; and automatically adapting network node equipment such that said category-specific coverage gaps are reduced in size.

20. A computer implemented method of adapting radio coverage areas associated with a mobile network, the method comprising:

at mobile network provider equipment (PE), receiving, for each of a plurality of common-category user equipment (UE) active within the mobile network, communications indicative of UE capability, UE location, and UE quality of service (QoS);

correlating, for each common-category UE, contemporaneously received UE location and service information indicative of a threshold level of service to derive therefrom category-specific service edge locations;

determining, using said category-specific service edge locations, corresponding category-specific coverage gaps; and automatically adapting network node equipment such that said category-specific coverage gaps are reduced in size.

* * * * *